Sept. 15, 1953
F. C. NEUHART ET AL
2,652,439
HYDROCARBON SEPARATION
Filed Nov. 3, 1949
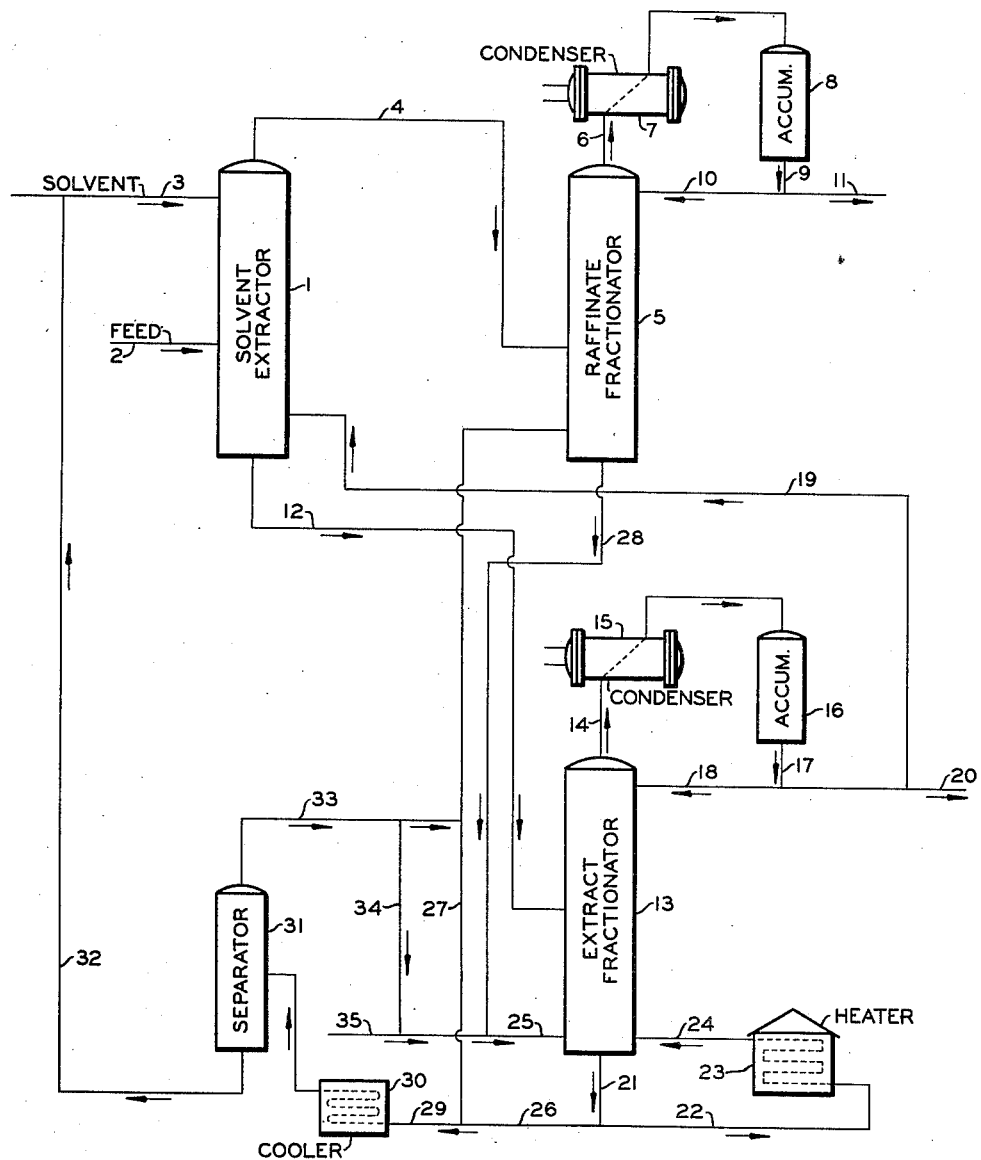
INVENTORS
F. C. NEUHART
G. A. GOHLKE
BY Hudson and Young
ATTORNEYS Patented Sept. 15, 1953

2,652,439

UNITED STATES PATENT OFFICE 2,652,439

HYDROCARBON SEPARATION

Frederick C. Neuhart and Gerhard A. Gohlke, Bartlesville, Okla., assignors to Phillips Petroleum Company, a corporation of Delaware Application November 3, 1949, Serial No. 125,298

6 Claims. (Cl. 260—676)

This invention relates to a process for the resolution of mixtures of difficultly separable hydrocarbons. In a specific aspect this invention relates to a process for the separation of unsaturated hydrocarbons from close-boiling, more saturated hydrocarbons. In a more specific aspect this invention relates to a process for the separation of paraffinic hydrocarbons from mono-olefinic hydrocarbons. In one specific aspect this invention relates to the resolution of a mixture of propane and propylene.

The separation of olefinic hydrocarbons from corresponding paraffinic hydrocarbons usually cannot be simply accomplished because of the close boiling range of the compounds. It has heretofore been attempted to solve this problem by the use of azeotropic distillation, extractive distillation, and liquid-liquid solvent extraction, and efforts are continually being made to improve upon such processes in order that the expense of separation can be kept at a minimum. My invention is particularly directed to a process for the resolution of difficultly separable hydrocarbon mixtures employing a liquid-liquid solvent extraction.

It is an object of this invention to provide a novel and improved process for separating mixtures of close-boiling hydrocarbons by liquid-liquid solvent extraction.

It is another object of this invention to effect a separation of close-boiling hydrocarbons by solvent extraction by introducing an intermediate boiling compound to the system.

It is a further object of this invention to effect such a separation by employing a novel internal recycle and heat transfer operation within the system.

It is a further object of this invention to employ such a system for the resolution of olefinic and hydrocarbon mixtures.

It is a further object of this invention to employ such a system for the resolution of a mixture of propylene and propane.

Additional objects of our invention will be readily apparent from our disclosure hereinbelow and accompanying drawing.

We have found that mixtures of difficultly separable hydrocarbons can be readily and economically resolved by a solvent extraction process which employs in the system an intermediate boiling compound and an internal recycle and heat transfer operation. Our invention can be readily understood by referring to the accompanying drawing which is a schematic diagram of a preferred method for effecting our process.

This drawing does not include such conventional equipment as pumps, compressors, valves and the like, but the inclusion of such equipment is believed to be a modification within the scope of our invention.

Our invention can be applied to any liquid-liquid solvent extraction process for the resolution of mixtures of close-boiling hydrocarbons. We will describe our process in detail for the resolution of a propane-propylene mixture, but other mixtures can be similarly resolved. For example, mixtures of butane and butenes, of pentane and pentenes, and of hexane and hexenes can be similarly resolved. Our process may be generally employed for the separation of an unsaturated hydrocarbon from a more saturated hydrocarbon and, particularly, for the separation of a paraffinic hydrocarbon from a mono-olefinic hydrocarbon. Thus, in addition to the specific mixtures of hydrocarbons named above, the process may be used to resolve mixtures of close-boiling cycloaliphatic hydrocarbons, such as cyclopentane and cyclopentene, methylcyclohexane and methylcyclohexene, and the like. Also, mixtures of close-boiling aromatic and aliphatic hydrocarbons may be resolved. For example, by a suitable selection of solvent for solvent extraction, an aromatic gas-oil can be separated from admixture with a paraffinic gas-oil by liquid-liquid extraction.

For the solvent extraction step in our process a suitable solvent is employed. This solvent is the highest boiling compound in the entire system, and it is selective for unsaturated hydrocarbons in preference to less unsaturated or saturated hydrocarbons. Consequently, the more unsaturated hydrocarbon is concentrated in the kettle product or extract phase from the solvent extraction step, and the more saturated hydrocarbon is concentrated in the overhead or raffinate phase. In the detailed disclosure of our invention for the resolution of a mixture of propane and propylene we employ furfural as a solvent. However, other well-known solvents may be similarly utilized, such as aliphatic alcohols and aliphatic compounds containing, in addition to a hydroxyl group, some other group, such as a halogen and, particularly, a chloro group. Specifically, ethyl alcohol, propyl alcohol, butyl alcohol, and the higher-boiling alcohols and chlorinated derivatives of these aliphatic alcohols may be used. Also, chloro-ethers, such as β,β-dichlor diethylether, are suitable solvents. Aromatic hydroxy compounds, such as phenol and the cresols, are similarly useful, and aromatic nitrogen-containing compounds, such as nitrobenzene, pyridine, the picolines and aniline, are quite useful in our process.

Subsequent to the solvent extraction step, the extract phase and the raffinate phase are separately fractionated in order to recover a more unsaturated hydrocarbon concentrate and a more saturated hydrocarbon concentrate. To facilitate these fractionations an inert organic compound, boiling intermediate the hydrocarbon mixture being resolved and the solvent employed for the solvent extraction step, is introduced to the system at a suitable point, preferably near the bottom of the fractionator for the extract phase. In our process this intermediate boiling compound is present in the fractionators for the extract and raffinate phases, and in both fractionators it facilitates the separation being made by lowering the boiling point of the kettle product, by preventing the appearance of solvent in the overhead from the fractionators and by preventing decomposition of the solvent. The intermediate boiling compound must be non-reactive with the hydrocarbons being separated and with the solvent employed. Since the intermediate boiling compound is frequently found in the overhead fractions from the extract phase and raffinate phase fractionators, the compound should be such that its presence in these overhead fractions is not undesirable. Actually, the intermediate boiling compound is present in these overhead fractions in small concentrations, usually less than 2 per cent, and by employment of suitably high reflux ratios the concentration of the compound in the overhead fractions can be greatly reduced and, if desired, eliminated. In our detailed disclosure hereinbelow for the resolution of a propane-propylene mixture employing furfural as solvent, butane was used as the intermediate boiling compound. However, other similar saturated hydrocarbons, such as pentane, hexane, heptane, and the like, and mixtures of the same may be similarly employed. Additionally, cycloparaffinic hydrocarbons, such as cyclobutane, cyclopentane, cyclohexane, cycloheptane, and mixtures thereof may be used as well as suitably selected aromatic hydrocarbons, such as benzene, toluene, xylene, ethylbenzene, and other alkylated benzene hydrocarbons. Furthermore, suitably selected oxygenated hydrocarbon derivatives, such as ketones and ethers, may also be employed. Typical examples of these compounds are the butanones, pentanones, hexanones, and the like, amyl ethyl ether, butyl methyl ether, ethyl hexyl ether, ethyl isoamyl ether, and the like.

The amount of intermediate boiling compound employed in the extract fractionator is such that the kettle temperature of the extract fractionator is at least 100° F. higher than the kettle temperature of the raffinate fractionator. In our preferred embodiment we employ a temperature differential of about 200° F. Actually, when employing furfural and butane, the volumetric ratio of furfural to butane is within the range of 6:1 to 14:1 in the extract fractionator.

Referring now to the accompanying drawing for a specific arrangement of the various steps and for a specific and preferred method of effecting our process, a hydrocarbon mixture containing 33 per cent propylene and 67 per cent propane enters solvent extractor 1 via line 2 and the solvent, furfural, enters the extractor via line 3. The pressure in extractor 1 is such that liquid-liquid contacting of the solvent and hydrocarbon feed is effected, and usually a pressure of 120 pounds per square inch absolute is adequate. Also, it is preferred to introduce the furfural near the top of the extractor, and the hydrocarbon feed is introduced to the extractor at or near the middle thereof. In the extractor the propylene is concentrated in the solvent or extract phase which is withdrawn from the bottom of the extractor. Propane is concentrated in the raffinate phase in the extractor, and it is withdrawn from extractor 1 via line 4 and passed to raffinate fractionator 5. The raffinate phase entering fractionator 5 is a propane concentrate containing some propylene and furfural. Raffinate fractionator 5 is operated at a pressure of 170 pounds per square inch absolute with a top tray temperature of 92° F. and a bottom temperature of 245° F. The overhead from fractionator 5 containing propane along with some propylene is withdrawn via line 6 and condenser 7 into accumulator 8 which is operated at a pressure of 165 pounds per square inch absolute and a temperature of 90° F. Propane concentrate is withdrawn from accumulator 8 via line 9, and a portion thereof is returned to fractionator 5 as reflux via line 10. The balance of the propane concentrate is withdrawn from the system via line 11 as a product of the process. The bottoms product from fractionator 5 and its use will be described hereinbelow.

Extract phase from the solvent extraction step is withdrawn from the bottom of extractor 1 via line 12 and passed to extract fractionator 13. This extract phase contains, in addition to furfural, propylene and some propane, and it is fractionated in fractionator 13 at a pressure of 205 pounds per square inch absolute with a top tray temperature of 92° F. and a kettle temperature of 445° F. At a point intermediate the bottom of fractionator 13 and the point of introduction of extract phase to fractionator 13 an inert, intermediate boiling, organic compound, such as butane, is introduced to the fractionating column via line 25, and it is preferable to introduce the butane near the bottom of the column. As a consequence of the butane introduction the kettle temperature in fractionator 13 is lower than that employed in processes effected without the use of intermediate boiling compounds. Also, no furfural is found in the overhead from fractionator 13, and the kettle temperature is not sufficiently high to cause decomposition of the furfural. A propylene-rich overhead is withdrawn from fractionator 13 via line 14 and condenser 15 into accumulator 16 which is operated at a pressure of 200 pounds per square inch absolute and a temperature of 90° F. From accumulator 16 propylene concentrate is withdrawn via line 17 and a portion thereof is returned to fractionator 13 via line 18 as reflux. If desired, another portion may be recycled to extractor 1 via line 19 as reflux to improve the separation therein, and the remaining portion of the propylene concentrate is withdrawn via line 20 as a product of the process.

Bottoms product, containing furfural and butane, from fractionator 13 is withdrawn via line 21, and a portion thereof is passed via line 22 and heater 23 and thence returned to fractionator 13 via line 24 as a means for maintaining the desired temperature therein. Bottoms product not required to maintain the temperature level in fractionator 13 is passed via line 26, and a portion thereof is passed via line 27 to fractionator 5. Since the kettle temperature of fractionator 13 is 445° F. and since the kettle temperature of fractionator 5 is maintained at 245° F., a sufficient quantity of bottoms product from fractionator 13 is thus employed in fractionator 5 to maintain the desired temperature level therein. The bottoms product flowing via line 27 supplies all the heat that is required to maintain the desired temperature in the kettle of fractionator 5. Consequently, butane is also introduced to fractionator 5, where it facilitates the fractionation therein in a manner similar to that described above for fractionator 13. Some butane may be found in the propane concentrate withdrawn from the system via line 11, but most of the butane and all the furfural that entered fractionator 5 is withdrawn therefrom via line 28 and returned to fractionator 13 with the butane flowing via line 25. Thus, our process contains an internal recycle system whereby heat is supplied to fractionator 5 by the bottoms product from fractionator 13 and the bottoms product from fractionator 5 is subsequently returned to fractionator 13. When using this internal recycle system it is unnecessary to supply heat to fractionator 5 from any other source.

The remaining portion of the bottoms product from fractionator 13 passes via line 29 and through cooler 30 where the temperature is reduced to 100–110° F. The thus-cooled bottoms product passes to separator 31 where a phase separation between butane and furfural is effected. Furfural is removed from separator 31 via line 32 and recycled to extractor 1 via line 3. Butane is removed from separator 31 via line 33 and thence returned to fractionator 13 via lines 34 and 25. Fresh butane is introduced to the system via line 35. In order that fractionator 5 may contain sufficient butane to facilitate the fractionation, a portion of the butane flowing via line 33 may be withdrawn via line 36 and thus introduced to line 27, if necessary.

Under the conditions of operation described hereinabove, the propane concentrate withdrawn from the system via line 11 contains 84.8 per cent propane, 13.5 per cent propylene and 1.7 per cent butane. The butane concentration may be reduced by increasing the reflux ratio for fractionator 5, but an increase in reflux ratio necessitates an increase in the heat requirements for fractionator 5 which, in turn, places an increased load upon heater 23. An increased load upon heater 23 may not be warranted, particularly in cases where the butane in the propane concentrate has no undesirable effect. The propylene concentrate withdrawn from the system via line 20 contains 78.4 per cent propylene, 21.0 per cent propane and 0.6 per cent butane. This butane concentration may also be reduced by increasing the reflux ratio for fractionator 13, but such an increase may uneconomically increase the load on heater 23 since the butane in the propylene concentrate in most cases is not undesirable. Also, at the conditions described for our process the kettle product from fractionator 13 contains 88.9 per cent furfural, 11.0 per cent butane and 0.1 per cent propane.

In another embodiment of our process, separator 31 may be eliminated from the process, and the bottoms product from fractionator 13 flowing via line 29 is passed to extractor 1 via line 32. In that event, butane is introduced to extractor 1 along with the furfural, but this is not deleterious to our process. Most of the butane entering extractor 1 is removed in the raffinate phase via line 4 and thence it enters fractionator 5 where it facilitates the fractionation step as already described.

When treating 2400 barrels per day of a mixture containing 33 per cent propylene and 67 per cent propane in accordance with our process, 1707 barrels per day of propane concentrate and 726 barrels per day of propylene concentrate are obtainable, said concentrates having the compositions set forth above. Since these concentrates contain a small percentage of butane which is removed from the system, it is necessary to introduce 33 barrels per day of make-up butane to the system.

From the above disclosure numerous variations of our process well within the scope of our invention will be obvious to those skilled in the art.

We claim:

1. The process for resolving a mixture of close-boiling unsaturated and more saturated aliphatic hydrocarbons which comprises contacting said mixture in liquid phase with a liquid solvent higher boiling than the hydrocarbons in said mixture and selective for the more unsaturated hydrocarbons in said mixture, fractionally distilling the extract phase from said contacting step in the presence of an inert organic compound boiling intermediate said solvent and the hydrocarbons in said mixture, recovering from said fractionation step an unsaturated hydrocarbon concentrate as a product of the process, withdrawing a first bottoms product from said fractionation step containing liquid solvent and intermediate boiling organic compound at a temperature higher than the temperature of a second bottoms product from a second fractionation step to be described, passing said first bottoms product at said higher temperature from said first fractionation step to said second fractionation step, fractionally distilling raffinate phase from said first-named contacting step in the presence of said first bottoms product containing said intermediate boiling organic compound from the first named fractionation step as a source of heat for the second fractionation step, and recovering from said second fractionation step a concentrate of hydrocarbon more saturated than said unsaturated hydrocarbon as a product of the process.

2. The process for resolving a mixture of close-boiling olefinic and paraffinic hydrocarbons which comprises contacting said mixture in liquid phase with a liquid solvent higher boiling than the hydrocarbons in said mixture and selective for the olefinic hydrocarbons in said mixture, fractionally distilling extract phase from said contacting step in the presence of an inert organic compound boiling intermediate said solvent and the hydrocarbons in said mixture, recovering from said fractionation step an olefinic hydrocarbon concentrate as a product of the process, withdrawing a first bottoms product from said fractionation step containing liquid solvent and intermediate boiling organic compound at a temperature higher than the temperature of a second bottoms product from a second fractionation step to be described, passing said first bottoms product at said higher temperature from said first fractionation step to said second fractionation step, fractionally distilling raffinate phase from said first-named contacting step in the presence of said first bottoms product containing said intermediate boiling organic compound from the first named fractionation step introduced to the bottom of the second fractionation step as a source of heat for the second fractionation step, passing bottoms product containing liquid solvent and intermediate boiling organic compound from said second fractionation step directly to said first-named fractionation step, and recovering from said second fractionation step a paraffinic hydrocarbon concentrate as a product of the process.

3. A process according to claim 2 wherein the liquid solvent is furfural.

4. A process according to claim 2 wherein the olefinic and paraffinic hydrocarbons are propylene and propane, respectively.

5. A process according to claim 4 wherein the inert organic intermediate boiling compound is butane.

6. The process for resolving a mixture of close-boiling, difficultly separable hydrocarbons which comprises contacting said mixture in liquid phase with a liquid solvent higher boiling than the hydrocarbons in said mixture and selective for the more unsaturated hydrocarbons in said mixture, fractionally distilling extract phase from said contacting step in the presence of an inert organic compound boiling intermediate said solvent and the hydrocarbons in said mixture, recovering from said fractionation step an unsaturated hydrocarbon concentrate as a product of the process, withdrawing a first bottoms product from said fractionation step containing liquid solvent and intermediate boiling organic compound at a temperature higher than the temperature of the second bottoms product from a second fractionation step to be described, passing at least a portion of said first bottoms product at said higher temperature from said first fractionation step to said second fractionation step, fractionally distilling as said second fractionation step raffinate phase from said first-named contacting step in the presence of said portion of said first bottoms product as a source of heat and said intermediate boiling organic compound, cooling the other portion of the first bottoms product to cause phase separation into intermediate boiling organic compound and solvent rich phases, returning said solvent rich phase to the supply of solvent to said contacting step, adding at least a portion of said intermediate boiling organic compound phase to said second fractionation step, passing bottoms product containing liquid solvent and intermediate boiling organic compound from said second fractionation step directly to said first-named fractionation step, and recovering from said second fractionation step a concentrate of hydrocarbon more saturated than said unsaturated hydrocarbon as a product of the process.

FREDERICK C. NEUHART.
GERHARD A. GOHLKE.

References Cited in the file of this patent

UNITED STATES PATENTS

| Number | Name | Date |
|---|---|---|
| 2,341,812 | Pierotti | Feb. 15, 1944 |
| 2,366,360 | Semon | Jan. 2, 1945 |
| 2,443,245 | Hibshman | June 15, 1948 |